May 27, 1952     A. P. JOHNSTONE     2,598,176
SEALING DEVICE

Filed Feb. 26, 1948     3 Sheets-Sheet 1

May 27, 1952     A. P. JOHNSTONE     2,598,176
SEALING DEVICE

Filed Feb. 26, 1948            3 Sheets-Sheet 2

May 27, 1952  A. P. JOHNSTONE  2,598,176
SEALING DEVICE

Filed Feb. 26, 1948  3 Sheets-Sheet 3

Inventor
Alexander Pearse Johnstone
By
Stevens, Davis & Miller
Attorneys

UNITED STATES PATENT OFFICE 2,598,176

SEALING DEVICE

Alexander Pearse Johnstone, Frimley, England, assignor to Power Jets (Research and Development) Limited, London, England, a British company Application February 26, 1948, Serial No. 11,173
In Great Britain March 11, 1947

4 Claims. (Cl. 253—39.15)

This invention relates to devices for providing a seal between relatively movable bodies in circumstances in which it is required that in use there should be maintained, between the sealing device and the relatively moving body to which it is presented, the least practicable clearance compatible with avoidance of destructive rubbing contact of said seal and body. The satisfaction of this requirement is a matter of no little difficulty in cases where for any reason the relative location of the bodies between which sealing is to be effected is variable in a sense resulting in modification of the clearance between the seal and the body to which it is presented. Unless some provision is made for limiting the possibility of destructive rubbing contact, such clearance must be made unnecessarily large with a consequent reduction in the effectiveness of the seal. It is an object of the present invention to make such provision.

According to the invention, a device forming except working clearance a seal between relatively movable bodies comprises a sealing element which is movable in a sense such as to vary a clearance between itself and the body to which it is presented, and the sealing element is prevented from closing the gap by the pressure of a gaseous fluid acting on the sealing element in the sense of increasing the clearance and leaking through the latter, the supply of pressure fluid being limited so that there will be a drop in the pressure acting to increase the clearance when the latter exceeds a predetermined value.

The sealing element is mounted so as to be movable (in a sense such as to modify the clearance) independently of either of the bodies between which sealing is to be effected, and is biassed by the pressure of a second gaseous fluid in a sense tending to close the clearance. In a preferred form of the invention such biassing is obtained by allowing a fluid against which the seal is to be effective to act on one face of the sealing element, the pressure of the clearance-increasing fluid referred to acting in opposition on another face. In any case it is contemplated that the value of the biassing force and of the maximum opposing pressure obtainable in the clearance-increasing fluid will be appropriately related to ensure the maintenance of the clearance.

In one form of the invention the clearance-increasing fluid is introduced through a plurality of ports in a face bounding the clearance space to be maintained, for example, a face of the body to which the sealing element is presented, so as to be discharged into said clearance space. In this way, so long as a gaseous fluid supply of adequate pressure is maintained through the ports, the sealing element will be distanced from the relatively moving body by a gaseous layer whose pressure will rise as the clearance becomes less than a predetermined value, and vice versa.

The invention has particular application to the case where a seal has to be provided between relatively rotating parts defining successive sections of an annular duct, as, for example, the stationary structure and rotor of a turbine. In such a case the invention contemplates that the sealing element will be an annulus mounted on and coaxial with one of the relatively rotating parts, normally a stationary one, the annulus being capable of axial movement on its supporting part to allow variation of its axial clearance from the other part, and its axial location being controlled by gas pressure as already described.

In principle, the sealing element may be mounted in any convenient way which will enable it to move freely to vary its clearance from the body to which it is presented.

In a preferred form the sealing element is mounted on its supporting structure through the intermediary of secondary sealing means offering a yielding bearing surface which makes substantially gas tight engagement with an opposed surface, the two surfaces being such that relative sliding movement can take place between them to accommodate relative clearance-modifying movement between said sealing element and supporting structure. Thus, when the sealing element is an annulus as described in the foregoing, its mounting so that it will remain freely slidable and yet sufficiently gas tight over a wide range temperature conditions is a serious problem, particularly in the case of gas turbines, in which the temperature range is very large and there may be a considerable temperature gradient between radially outer and inner parts of the structure resulting in appreciable changes of the relative diameters of the sealing annulus and its support. In order to meet this difficulty it is proposed to mount the annulus on its supporting part through the intermediary of one or more peripherally extending and radially yielding secondary seating elements which are in general of ring form although not necessarily formed by individually complete rings, and offer a bearing surface which makes substantially gas tight engagement with an opposed surface, the two surfaces being such that relative sliding movement can take place between them in the axial direction.

In the accompanying drawings embodiments of the invention are shown in which—

Figure 1:
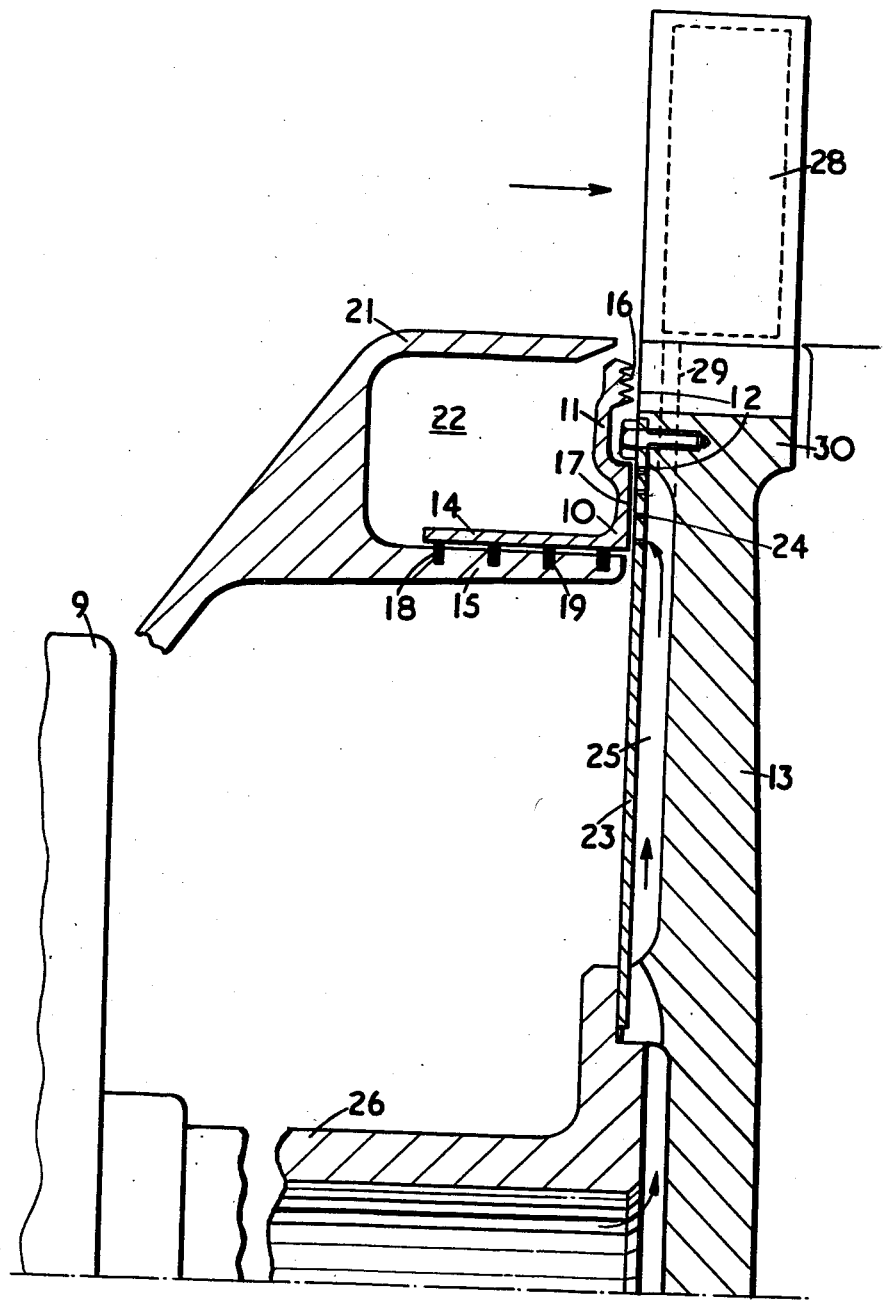
Figure 1 is a part sectional view of a compressor gas turbine plant with an annular sealing element and with a pressure fluid supply for the clearance derived from the compressor.

In the example considered, the sealing element 10 consists of an annular body of more or less right angled cross section having one of its parts or arms 11 extending radially in a plane closely adjacent to a face 12 of the turbine rotor 13 with which the seal is to be made and slidably mounted by its other and axially extending part or arm 14, upon a stationary supporting annulus 15 so as to be capable of movement in the axial direction of the rotor 13.

The radially extending part or arm 11 of the sealing element 10 is provided with a normal type of labyrinth seal 16 towards its outer edge which is presented to the rotor face 12 while the inner part is provided with a plane face 17, the tips of the labyrinth seal 16 being in the same plane as the face 17.

The slidable mounting of the sealing body 10 is effected through the medium of peripherally extending and axially spaced rings 18 which are arranged to yield resiliently, these rings 18 being mounted in grooves 19 in the supporting annulus 15 and bearing against the part or arm 14 making substantially gas tight contact therewith. The rings 18 may be arranged in the part or arm 14 and contact the supporting annulus 15. The adjacent ends of divided parts of a ring will normally have a stepped overlap or other provision to provide a peripherally continuous seal, although where working conditions make it expedient a passage may be deliberately left to allow controlled leakage past the rings 18 for cooling purposes.

The axially extending part or arm 14 of the sealing element 10 remote from the rotor 13 is enclosed by stationary structure 21 in such a way as to define therewith a chamber 22 around the sealing element 10 which is in communication with the working fluid flow to the turbine rotor 13 so that the sealing element 10 when in operation is subject to the pressure of the fluid flow and will be biased in the sense of urging the sealing element 10 into engagement with the rotor base 12, this movement being allowed by the slidable mounting of the sealing element 10 on the rings 18.

The plane face 12 which is formed partly on the rotor 13 itself and partly by a plate 23 secured to the rotor 13 is in axial register with the plane face 17 at the inner part of the part or arm 11 of the sealing element 10. A number of small holes or ports 24 are formed in the plate 23 opposite the plane face 17. A supply of air under pressure is directed to the ports 24 for discharging the air into the clearance between the two faces 12 and 17. The air supply may be obtained, in the case of a gas turbine driving an air compressor 9 by tapping air from it and conducting it through the passage 25 formed between the plate 23 and the rotor 13 and through the hollow shaft 26.

Figure 2:
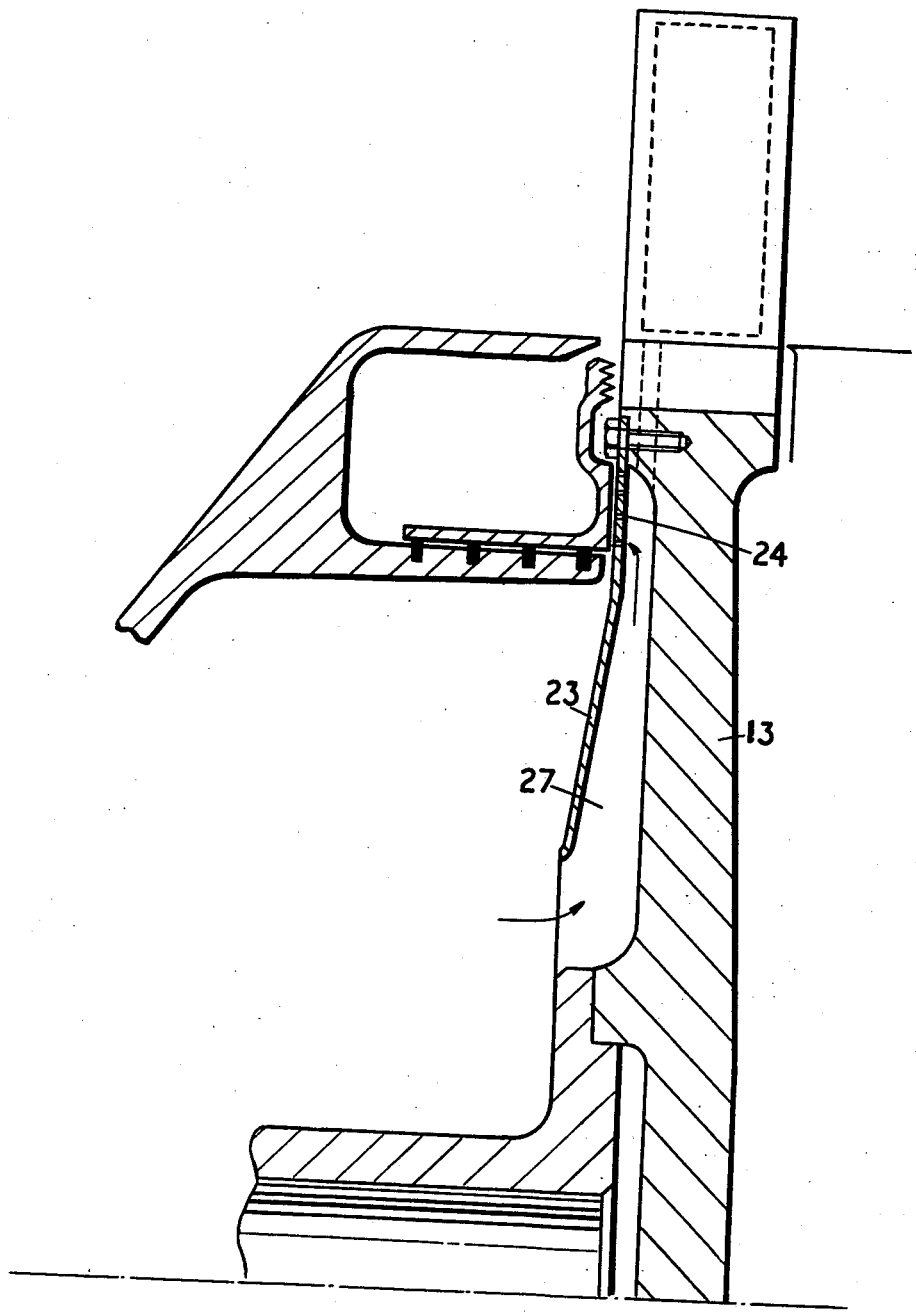
Figure 2 is a modification of Figure 1 with the pressure fluid supply derived from a centrifugal compressor combined with the rotor of the turbine.

An alternative, however, which has the advantage of not relying upon such elaborate connections as might be involved in tapping the compressor, is for the turbine rotor 13 itself to be formed with vanes 27 which will act as a centrifugal compressor supplying the necessary air between the faces 12 and 17 (see Figure 2).

In use under operating conditions the pressure of the working fluid will urge the sealing element 10 towards the rotor 13. Actual contact will, however, be prevented by the building up of air pressure in the clearance between the opposing plane faces 12 and 17 of the rotor 13 and the sealing element 10 respectively, so that although a very small clearance may be maintained, actual contact between the sealing element 10 and the rotor 17 cannot take place given adequate air supply pressure, even though the rotor 13 and stationary structure 21 may undergo appreciable relative displacement due to changes of operating temperature or for other reasons. On the other hand, the supply of compressed air being limited by the size of its entry ports, an increase of the clearance beyond a predetermined value will result in a pressure drop in the clearance space and a consequent restoring movement of the sealing element 10.

The flow of air to the faces 12 and 17 not only maintains the clearance of the sealing element 10 but also assists in the cooling of the turbine rotor 13 and in this connection, if hollow turbine blades 28 are used, a proportion of this air may be utilized to cool the turbine blading 28 by being passed through passages 29 in the rotor rim 30 to the interior of the hollow blades 28.

Figure 3:
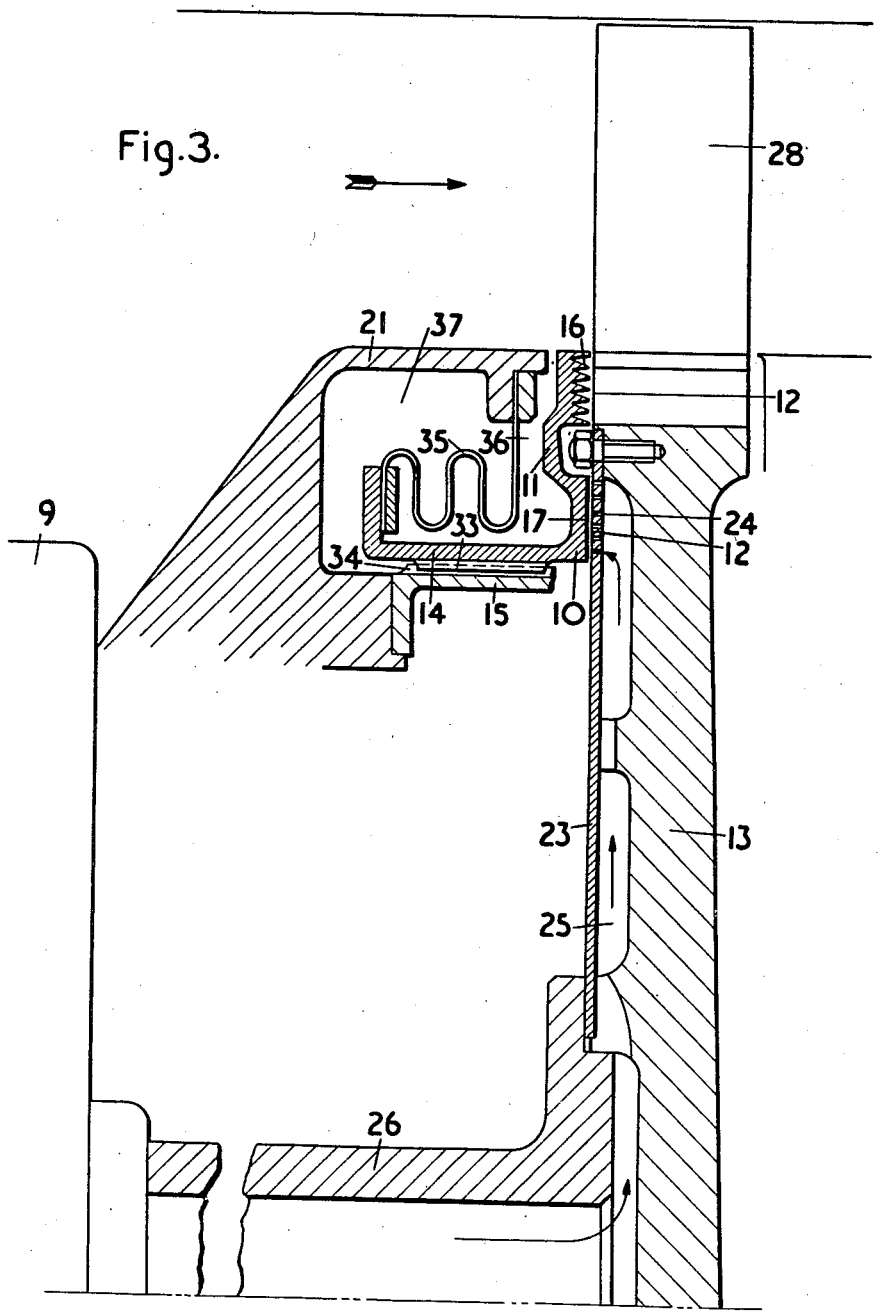
Figure 3 is another modification of the annular sealing element.

In a further construction (see Figure 3), the sealing element 19 is provided with splines 33 formed on the part 14 which mate with spline 34 formed on the supporting annulus 15. The splines 33 and 34 are arranged parallel with the axis of the rotor 16 so that the sealing element 10 can slide towards and away from the rotor 13 under the influence of the working fluid and the compressed air between the face 12 and 17.

Also the edge of the axially extending part or arm 14 of the sealing element 10 remote from the rotor 13 is connected to the stationary structure 21 by an annular flexible metal bellows 35. The bellows 35 defines with the sealing element 10 a chamber 36 which is in communication with the working fluid flow and with the stationary structure 21, a chamber 37. The bellows 35 is arranged to give an initial bias to the sealing element 10 to ensure that it will be held clear of the rotor 13 when the rotor 13 is not rotating.

I claim:

1. A sealing apparatus for preventing a substantial leakage of a gaseous pressure fluid between face elements on two relatively rotatable bodies constituting a gap forming a small working clearance to be maintained without actual rubbing contact comprising in combination an annular face element formed on one of said bodies and constituting one face element of said gap, a support structure on the other of said bodies having channel walls defining an annular channel concentric with the axis of relative rotation of said bodies and opening adjacent said one face element and with at least one of said channel walls also concentric with said axis, an annular movable sealing member having a face element formed thereon and constituting the other face element of said gap slidably supported on said concentric channel wall for movement to increase and decrease the width of said gap and constructed and shaped so as to be capable of being acted upon by said gaseous pressure fluid and enabling it to be moved thereby in a direction tending to close said gap, said face elements being arranged at an angle to said axis so that on movement of said movable sealing member they are capable of relative displacement to increase or decrease the width of said gap and one of said face elements being formed with a plurality of ports disposed in a uniform pattern over the surface thereof with each port constructed so as to be capable of directing gaseous fluid perpendicularly across said gap to impinge upon said other face element, and a gaseous pressure fluid supply means for supplying a second gaseous pressure fluid to issue from said plurality of ports at a pressure sufficient to prevent said face elements from actual rubbing contact when said movable sealing member moves to close said gap under the action of said first gaseous pressure fluid.

2. A sealing apparatus for preventing a substantial leakage of gaseous pressure flluid between face elements on two relatively rotatable bodies constituting a gap forming a small working clearance to be maintained without actual rubbing contact comprising in combination an annular face element formed on one of said relatively rotatable bodies in a radial plane with relation to the axis of relative rotation of said bodies and provided with a plurality of ports arranged in a uniform pattern over the surface thereof with each port constructed so as to be capable of directing a gaseous fluid perpendicularly across said gap to impinge upon said other face element, an annular support structure on the other of said bodies having channel walls defining an annular channel concentric with the axis of relative rotation of said bodies and opening adjacent said one face element and with said channel walls also concentric with said axis, an annular movable sealing member of substantially right-angled cross section having two annular face elements at right angles to one another, one disposed concentrically with said axis and slidably supporting said element on the inner concentric channel wall for movement thereon to increase or decrease the width of said gap and the other disposed in a radial plane with relation to said axis and constituting the other face element of said gap arranged adjacent said one face element, said right-angled construction of said sealing member being capable of being acted upon by said gaseous pressure fluid and enabling said member to be moved thereby in a direction tending to close said gap, and a gaseous pressure fluid supply means for supplying a second gaseous pressure fluid to issue from said plurality of ports at a pressure sufficient to prevent said face elements from actual rubbing contact when said movable sealing members move to close said gap under the action of said first gaseous pressure fluid.

3. A sealing apparatus for preventing a substantial leakage of a gaseous pressure fluid between face elements on two relatively rotatable bodies constituting a gap forming a small working clearance to be maintained without actual rubbing contact comprising in combination an annular face element formed on the rotatable body in a radial plane with relation to the axis of rotation and provided with a plurality of ports arranged in a uniform pattern over the surface thereof with each port constructed so as to be capable of directing a gaseous fluid perpendicularly across said gap to impinge upon said other face element, an annular support structure on the stationary body having axially directed channel walls defining an annular channel concentric with said axis and opening adjacent said one face element on said rotatable body and with said channel walls also concentric with said axis, an annular movable sealing member of substantially right-angled cross section having two annular face elements at right angles to one another, one disposed concentrically with said axis and slidably supporting said member on the inner concentric channel wall for movement thereon to increase or decrease the width of said gap and the other disposed in a radial plane with relation to said axis and constituting the other face element of said gap arranged adjacent said one face element, said right-angled construction of said sealing member being capable of being acted upon by said gaseous pressure fluid and enabling said member to be moved thereby in a direction tending to close said gap, and a compressor rotated by said rotatable body for supplying a second gaseous pressure fluid to issue from said plurality of ports at a pressure sufficient to prevent said face elements from actual rubbing contact when said movable sealing member moves to close said gap under the action of siad first gaseous pressure fluid.

4. A sealing apparatus for a gas turbine for preventing a substantial leakage of the turbine gaseous working pressure fluid between face elements formed on the rotor and stationary turbine rotor enclosing structure and constituting a gap forming a small working clearance to be maintained without actual rubbing contact comprising in combination an annular face plate secured on the rotor and disposed in a radial plane with relation to the axis of rotation and provided with a plurality of ports arranged in a uniform pattern over the surface thereof with each port capable of directing a gaseous fluid perpendicularly across said gap to impinge upon said other face element, an annular support structure formed on the stationary turbine rotor enclosing structure having axially directed channel walls defining an annular channel concentric with said axis and opening adjacent said ported face plate on said rotor and with said channel walls also concentric with said axis, an annular movable sealing member of substantially right-angled cross section having two annular face elements at right angles to one another, one disposed concentrically with said axis and slidably supporting said movable sealing member on the inner concentric channel wall for movement thereon to increase or decrease the width of said gap and the other disposed in a radial plane with relation to said axis and constituting the other face element of said gap arranged adjacent said ported face plate, said right-angled construction of said sealing member being capable of being acted upon by the gaseous working fluid of said turbine and enabling said member to be moved thereby in a direction tending to close said gap and a centrifugal compressor formed between said turbine rotor and said face plate for supplying a second gaseous pressure fluid to issue from said plurality of ports in said face plate at a pressure sufficient to prevent said face element on said movable sealing element from actual rubbing contact with said face plate when said movable sealing member moves to close said gap under the action of said turbine working fluid.

ALEXANDER PEARSE JOHNSTONE.

(References on following page)

REFERENCES CITED

The following references are of record in the file of this patent:

UNITED STATES PATENTS

| Number | Name | Date |
|---|---|---|
| 1,791,849 | Stauber | Feb. 10, 1931 |
| 1,936,771 | Schellens | Nov. 28, 1933 |
| 2,033,403 | Smittle | Mar. 10, 1936 |
| 2,077,038 | Carrier | Apr. 13, 1937 |
| 2,220,771 | McHugh | Nov. 5, 1940 |
| 2,241,782 | Jendrassik | May 13, 1941 |
| 2,336,474 | Fulcher | Dec. 14, 1943 |
| 2,497,704 | Voytech | Feb. 14, 1950 |
| 2,508,097 | Brown | May 16, 1950 |

FOREIGN PATENTS

| Number | Country | Date |
|---|---|---|
| 317,516 | Germany | Dec. 19, 1919 |
| 524,515 | Germany | May 8, 1931 |
| 907,059 | France | June 11, 1945 |